United States Patent [19]

Artur et al.

[11] 4,386,169

[45] May 31, 1983

[54] POLYMER MATRICES REINFORCED WITH CALCIUM CARBONATE PARTICULATES

[75] Inventors: André Artur, Nancy; Alain Dehut, Varangeville; Pierre Canard, Versailles, all of France

[73] Assignee: Rhone-Poulenc Industries, Paris, France

[21] Appl. No.: 256,047

[22] Filed: Apr. 21, 1981

[30] Foreign Application Priority Data

Apr. 21, 1980 [FR] France ............................ 80 08852

[51] Int. Cl.³ ..................... C08K 3/26; C08K 5/42; C08K 5/09

[52] U.S. Cl. ............................. 523/200; 524/157; 524/158; 524/161; 524/322; 524/394; 524/425; 524/567

[58] Field of Search ............... 260/234 XA; 523/200; 524/157, 158, 161, 425, 394, 322, 567

[56] References Cited

U.S. PATENT DOCUMENTS

| | | |
|---|---|---|
| 3,867,325 | 2/1975 | Hutton et al. ............... 260/234 XA |
| 3,996,173 | 12/1976 | Heichele et al. ............. 260/234 XA |
| 4,137,381 | 1/1979 | Kraus et al. ..................... 524/157 |
| 4,151,136 | 4/1979 | Cornell ............................. 524/399 |
| 4,252,698 | 2/1981 | Ito et al. .......................... 260/18 EP |
| 4,307,009 | 12/1981 | Luders et al. ................... 524/157 |

FOREIGN PATENT DOCUMENTS

| | | | |
|---|---|---|---|
| 2308225 | 9/1973 | Fed. Rep. of Germany | 524/425 |
| 2815176 | 11/1978 | Fed. Rep. of Germany | 524/425 |

*Primary Examiner*—Paul Lieberman
*Assistant Examiner*—Herbert J. Lilling
*Attorney, Agent, or Firm*—Burns, Doane, Swecker & Mathis

[57] ABSTRACT

Elastomeric/polymeric matrices, e.g., rigid polyvinyl chloride resins, are reinforced with impact strength enhancing amounts of calcium carbonate filler particulates, said particulates being surface area treated with both an organic sulfonic acid or salt thereof, and a fatty acid or salt thereof. The resultant compositions are well adapted for the fabrication of strong, useful shaped articles therefrom.

17 Claims, No Drawings

4,386,169

POLYMER MATRICES REINFORCED WITH CALCIUM CARBONATE PARTICULATES

BACKGROUND OF THE INVENTION

1. Field of the Invention

The present invention relates to novel calcium carbonate fillers, and, more especially, to calcium carbonate filled polymeric compositions, notably the rigid polyvinyl chlorides.

2. Description of the Prior Art

It has long been known to this art to use calcium carbonate particles as filler materials for elastomer or other polymer compositions. Such calcium carbonate is obtained from natural deposits, thereafter being finely ground (in either moist or dry state, but, if moist, followed by drying), or is obtained via chemical precipitation and drying of the precipitate. It too is known that the dispersibility of fillers in a polymeric matrix widely varies, depending upon the particle size of the filler, and characteristically decreaases with diminishing particle sizes; thus, to utilize very finely divided particulates in polymeric matrices, it is necessary to extend the mixing times therefore or the shearing effectiveness of the mixer. This is of course counterproductive as regards the heat-sensitive polymers, because any improvement in mechanical properties by reason of the filler content is lost due to concomitant thermal degradation of the polymer.

And different solutions have already been proposed to the art to offset the lack of affinity of calcium carbonate to materials which are essentially oleophilic, such as the typical natural and synthetic polymers. Thus, it is known to modify the surfaces of filler particles by treating them with a solution of polymer in solvent and then drying the treated particles; other known processes involve the preliminary treatment of the particulate filler with monomers, followed by polymerization thereof, and a third type of process features the fixation on the surfaces of the filler particles of oleophilic compounds, such as fatty acids. Finally, yet another category of process features the treatment of a calcareous filler to improve its wettability by means of hydrocarbons and plastic materials by contacting the same with alkylarylsulfonic acids or salts, the calcium salt thereof being essentially insoluble in water, in an amount at least equal to that required to form monomolecular layer or coating covering the entire surface of the particles or grains, as described in published French Application No. 2,138,300. This publication specifically relates to calcium carbonate powders having a low specific surface, on the order of 0.5 to 3 $m^2/g$ (BET method).

However, the aforesaid proposed solution does not suffice for all possible applications, either because of the filler itself or the particular utilization thereof.

It is also known that the incorporation of mineral fillers in a polymer matrix improves certain mechanical properties, while other properties may be diminished. This is particularly true in the case of polyvinyl chloride (PVC), the notched impact strength thereof being improved by the incorporation of a mineral filler such as calcium carbonate, but such improvement being obtained at the expense of the unnotched impact strength, which decreases. Furthermore, the aforenoted opposite effects become increasingly pronounced the smaller the size of the particles. Great need therefore exists for the identification of a calcium carbonate filler capable of imparting a high notch impact strength to a reinforced polymeric composition, without concomitantly giving rise to brittleness in the absence of a notch.

SUMMARY OF THE INVENTION

Accordingly, a major object of the present invention is the identification of a particular calcium carbonate filler which avoids those disadvantages and drawbacks to date characterizing the state of this art.

Briefly, the aforesaid and other objects of the invention are provided by treating calcium carbonate powder with an organic sulfonic acid or salt thereof, together with a fatty acid compound. Indeed, it has now been determined that for filler purposes a synergistic effect results from conjoint treatment with the sulfonic acid or salt thereof and the fatty acid compound, such that polymeric matrices reinforced therewith display enhanced impact strengths, both notch and otherwise, even though it is not necessary, contrary to the suggestions of the prior art, to utilize amounts of sulfonic acid/salt as would be required to form a monomolecular layer or coating over the entire surface area of the filler particles (not an insubstantial advantage when using a filler having a high specific surface).

DETAILED DESCRIPTION OF THE INVENTION

More particularly according to this invention, polymeric/elastomeric matrices, notably rigid polyvinyl chloride matrices, are filled with particulate calcium carbonate, which particles are surface treated with both sulfonic acid functions, or salts thereof, as well as fatty acid moieties. Even more preferably, said calcium carbonate particulates are surface treated with less than that amount of sulfonic acid/salt required to form a continuous monomolecular layer thin film thereof over the entire surface area of said particles, a particularly valuable alternative vis-a-vis the high specific surfaces of the starting material calcium carbonates.

Consistent with this invention, the calcium carbonate raw material is obtained by finely grinding natural calcium carbonate deposits, or, preferably, by chemical precipitation which results in finer particles. The particular process of chemical precipitation is not critical in and of itself, and the precipitated calcium carbonate may be obtained by one of the numerous processes per se known to the art. Thus, one process of preparation involving the carbonation of slaked milk of lime by means of lime kiln gas is suitable. The beginning calcium carbonate has a particle size between 0.05 N and 10 N, preferably between 0.07 N and 1 N, and a specific surface, measured by the BET method, between 50 $m^2/g$ and 0.2 $m^2/g$. Preferably, as filler for polymeric/elastomeric matrices, a calcium carbonate having a specific surface between 35 $m^2/g$ and 2 $m^2/g$ is used. Especially compare published Japanese Patent Application No. 71-15771 as regards the treated $Ca(CO_3)_2$ particulates themselves.

The sulfonic acid groups sorbed on the surface area of the subject calcium carbonate particulates are alkyl or alkylarylsulfonic acid functions, with the alkyl radical being either straight or branched chain and containing 8 to 25 carbon atoms and with the aryl radical including phenyl, naphthyl, and like radicals.

Exemplary such sulfonic acids comprise laurylsulfonic, alkylnaphthalene sulfonic, dodecylbenzene sulfonic, with the latter being particularly preferred in view of its commercial availability. Preferably, the organic sulfonic acid is such that its calcium salt is insoluble or only slightly soluble in water, for obvious reasons, as the product composition is prepared by a process of impregnation of a suspension followed by filtration.

Advantageously, the calcium carbonate particulates are directly treated, either with the organic sulfonic acids themselves, or with the alkali metal or ammonium salts thereof. Usually, for ease of handling and to ensure the homogeneity of the ultimate product, aqueous solutions thereof are preferably utilized as the means for effecting the subject surface treatment.

The amount of the organic sulfonic acid groups present in the particulates according to the invention may vary over wide limits as a function of the specific surface of the starting material calcium carbonate. It is typically between 0.03% and 8% with respect to the weight of the calcium carbonate having a specific surface within the aforenoted range. As hereinbefore mentioned, it is not necessary per this invention, in order to provide a $Ca(CO_3)_2$ filled reinforced polymer composition having good mechanical properties, that the amount of the organic sulfonic acid actually used be at least equal to that amount theoretically required to form a continuous monomolecular layer or thin film over the entire surface area of the particles. Thus, for a calcium carbonate obtained by precipitation, and having a high specific surface, i.e., between 10 and 50 $m^2/g$, preferably between 20 and 40 $m^2/g$, it is sufficient to treat the particles with from 1 to 6% by weight of, for example, dodecylbenzene sulfonic acid. In such example, said amount of the sulfonic acid is well below that value required to form a continuous monomolecular layer over the entire surface area of the calcium carbonate particulates.

The ratio of the organic sulfonic acid comprising the subject particulates to the minimum amount required to form the aforesaid monomolecular layer over the entire surface area thereof may vary widely, between 20 and 99%. However, in order to prepare treated particulates adapted to impart enhanced mechanical properties to polymer/elastomer compositions reinforced therewith, such ratio preferably ranges from 30 to 60%.

The fatty acids comprising the subject particulates according to the invention are selected from among the straight or branched chain aliphatic carboxylic acids preferably containing more than 10 carbon atoms. Representative of such acids is stearic acid. Advantageously, the calcium carbonate particulates are directly treated, either with the fatty acids themselves, or with the alkali metal or ammonium salts thereof. Usually, for ease of handling and to ensure the homogeneity of the ultimate product, aqueous solutions or suspensions of a salt of the fatty acid are utilized as the means for effecting the subject surface treatment. The amount of the fatty acid groups present in the particulates according to the invention may vary over wide limits as a function of the specific surface of the starting material calcium carbonate. Usually, by way of example, in the case of a precipitated calcium carbonate having a specific surface between 10 and 50 $m^2/g$, preferably between 20 and 40 $m^2/g$, and employing stearic acid, at least 1% by weight of fatty acid functions are introduced with respect to the weight of the starting material carbonate, and at most, 8%.

The process for the actual treatment of the particulates per this invention may be either a dry process, a wet process, or a mixed process.

In the first case, sulfonic/fatty acids, or salts thereof, are added to the dry calcium carbonate in pure state, or in a concentrated aqueous solution or suspension, in a conventional powder mixing apparatus, optionally followed by drying at a temperature between 80° C. and 120° C. The order of introduction of the respective acids/salts is immaterial, and such introduction may even be simultaneous. In the process of the second type, i.e., the wet process, the sulfonic/fatty acids, or salts thereof, are introduced, in either order or simultaneously, into an agitated slurry or suspension of calcium carbonate. If the calcium carbonate is prepared by chemical precipitation, the suspension may be that resulting from the production of the precipitate. The solids concentration of the aforesaid suspension is not critical and may vary in proportions as great as 2 to 60% by weight of solids with respect to the total weight, as a function of the specific surface. Following the introduction of acids/salts, the resulting mixture is homogenized for a period of time between 10 minutes and 2 hours, and may then be drained and dried to dryness by conventional means (furnace drying, atomization, etc.), in general at a temperature ranging from 80° C. to 120° C. It should be appreciated that in the wet process a fraction of the organic sulfonic acid may not be fixed to the calcium carbonate particles and consequently will be separated therefrom during filtration or draining; an excess of the sulfonic acid must therefore be provided, said excess being variable as a function of the type of carbonate employed and the precise conditions of treatment. Such excess is readily determined, however, by preliminary experiments under similar conditions, the objective to be attained being a given amount of sulfonic acid functions within the aforespecified range.

The "mixed" process according to the invention is one wherein one of the treating agents, preferably the agent for the incorporation of the fatty acid groups, is introduced under wet conditions. The suspension is then drained, washed, dried, and the second treating agent, preferably the agent for the incorporation of the sulfonic acid groups, is introduced dry into the resulting product. The mixed process is preferred when it is desired to economize on the amounts of treating agents used.

The treated particulates per the present invention are abundantly well suited as reinforcing fillers for elastomeric or other polymeric matrices. The treated particulates are especially adapted as fillers in matrices of rigid PVC; in this manner, molded, injection molded, or extruded shaped articles may be prepared having excellent notched or unnotched impact strength characteristics, a combination of properties which is difficult, indeed virtually impossible to obtain by using a calcium carbonate filler not treated as aforesaid, all other conditions being equal. The content of the filler in the polymer matrix, expressed in percentages by weight with respect to the polymer resin (pcr) varies widely as a function of the type of polymer, the mixing technique, the method of converting the mixture to the ultimate final product and the mechanical properties desired. It is thus advantageous to introduce between 1 and 60 pcr of the filler composition. Concerning the composition of rigid polyvinyl chloride for the extrusion of tubes or like shaped articles, a filler content of about 20 pcr is particularly suitable, such amount of filler being introduced into the matrix of the polymer after being intimately admixed in the powder state with the PVC and any different additives; such admixing is under either hot or cold conditions, in an external mixer, followed by extrusion using conventional apparatus, or pregranulation on a double screw extruder, or first mixing in an internal mixer, followed by extrusion using conventional equipment for the shape desired (tube, plate, film, and the like).

In order to further illustrate the present invention and the advantages thereof, the following specific examples are given (and wherein all parts and percentages are by weight, unless otherwise indicated), it being understood that same are intended only as illustrative and in nowise limitative.

EXAMPLE AND COMPARATIVE EXAMPLE 1

An aqueous suspension of precipitated calcium carbonate containing 3% dry solids, same having a BET specific surface of approximately 30 m$^2$/g, and prepared by the action of $CO_2$ on slaked milk of lime, was fractioned as follows:

A first fraction of the suspension was drained and dried to dryness at 80° C.; the resultant product constituted the control filler No. 1 in the hereinbelow Table I.

A second fraction of the suspension was divided into several lots and each lot was treated with a 4% aqueous solution of ammonium stearate, in amounts such that the precentages of fatty acid groups contained herein, in the sample compositions 2, 3, 6, 7 and 8, were as reflected in the following Table I hereinbelow. The resultant suspensions were homogenized, then drained and dried to dryness at 80° C.

Aliquot portions of the dried samples of the aforesaid stearate compositions Nos. 6, 7 and 8 of said following Table I were taken and each treated at 60° C. in a powder mixer with a 50% dodecylbenzenesulfonic acid solution, in amounts such that the percentages of organic sulfonic acid groups contained therein were as reflected in the ultimate sample compositions 6, 7 and 8 of Table I. Each was homogenized, and dried at 80° C. Compositions Nos. 6, 7 and 8 according to the invention were thus obtained.

Finally, a third fraction of the initial dried filler, but not having been subjected to the treatment with the fatty acid derivative, was divided into two lots and each lot treated as above with the same dodecylbenzenesulfonic acid solution to yield the control compositions Nos. 4 and 5 of Table I hereinbelow.

In this manner, five control compositions (Nos. 1 to 5) and three compositions (Nos. 6 to 8) according to the invention, were obtained.

The respective amounts of the fatty acid groups and the organic sulfonic acid groups in the several compositions are also reported in Table I.

It will be appreciated that composition No. 3 contains essentially that amount of stearic acid groups necessary to just form a monomolecular layer thereof over the entire surface area of the calcium carbonate having the intended specific surface, and that compositions Nos. 4 and 5 contain essentially that amount of sulfonic acid required to form a monomolecular layer of dodecylbenzenesulfonic acid functions.

EXAMPLE AND COMPARATIVE EXAMPLE 2

Utilizing the different filler compositions of the preceding example, polyvinyl chloride filled with 20 pcr of filler (percent by weight of filler with respect to the resin), said PVC resin having been prepared by mass polymerization and having a viscosity index of 95, the following recipe was formulated:
(i) Polyvinyl chloride 100 parts
(ii) Calcium carbonate filler 20 parts
(iii) Mercaptodioctyl tin 2 parts
(iv) Polyethylene wax 0.7 part
(PA 190 sold by the Hoechst Company)

The several ingredients were mixed together dry in a Henschel external mixer, the resulting powder subsequently being processed in a Banbury internal mixer for 4 minutes at 175° C., followed by malaxating in a roll mill for 4 minutes at 140° C. and then pressure molding at 180° C. for 18 minutes into the shape of plates.

On specimens cut from the different plates, the notched Charpy impact strength was measured according to ASTM standard D 256 (method B) at 23° C. and the unnotched Charpy impact strength at −20° C. according to the standard NFT 51035 (December 1970). For the latter test, the results were determined by the percentage of specimens broken during the test. A control plate of unfilled polyvinyl chloride was prepared in the same manner (Control 0).

The results of the different tests are compiled in the Table II which follows, with the numbers of the molded polymer compositions corresponding to the numbers of the filler compositions in Table I.

A comparison of the results of impact strength properties between the compositions of the invention and the control compositions evidences the synergism obtained per the invention, which is manifested by a slight embrittlement according to the unnotched impact strength tests, while obtaining unexpectedly large improvements in notched impact properties compared to an unfilled molded resin.

It will also be noted that the presence of only one of the two additives, even in large quantities, does not provide the same combination of properties, or improved results according to the invention.

EXAMPLE 3

This example illustrates an industrial application by extrusion of filled PVC No. 7 according to the invention.

The composition No. 7 of Example 2 was again prepared. After processing in a Banbury internal mixer and malaxation on a roll mill under the same conditions, the composition was granulated and subsequently fed into a single screw extruder (Samafor, 10 D) under typical tube extrusion conditions. The impact strength of tube thus molded was measured by dropping a weight thereon at 0° C. according to the method of ISO DIS 31272.

The impact strength is expressed in kg.m, and compared with a tube prepared under the same conditions, but the resin containing no filler.

The results were as follows:

(1) Tube prepared from the composition No. 7 according to the invention:
impact strength 2 kg · m
(2) Tube prepared from an unfilled composition:
impact strength 0.4 kg · m As a standard reference, a standard commercial PVC tube, either with or without a filler, has an impact strength by the same test of 0.4 to 0.6 kg and a commercial PVC tube reinforced with an elastomer by known means has an impact strength of about 2 kg.m.

Consequently, it appears from the foregoing results that the tube prepared from a composition of the present invention satisfies the requirements for tube with improved impact strength described in the draft of the ISO standard 138 N 633 (July 11, 1977).

EXAMPLE 4

A PVC formulation for extrusion was prepared, containing:

| | |
|---|---|
| (i) Polyvinyl chloride having a viscosity index of 95, prepared by mass polymerization | 100 parts |
| (ii) Calcium carbonate filler No. 7 of Example 1 | 20 parts |
| (iii) Mercaptodiethyl tin | 2 parts |
| (iv) Polyethylene wax (Trademark PA 190 marketed by the Hoechst Co.) | 0.7 part | as was one additional comparative formulation containing no carbonate.

From these formulations, granules were prepared for extrusion according to Example 3. The granules were extruded on a double screw extruder (Trademark IDE) equipped with a drawplate for rolling stock, and producing profiles or sections having a wall thickness of 1 mm.

The impact strengths of these shaped articles were measured on one of their face surfaces by dropping a weight thereon at 0° C. and −10° C., and the energy, in Joules, required to produce fracture for a drop height of 1 m, was measured.

The results are reported below:

| | Impact strength in Joules | |
|---|---|---|
| Profiles according to the invention (Filler No. 7) | 0° C. | > 50 |
| | −10° C. | 10 |
| Control profile | 0° C. | 10 |
| | −10° C. | 2 |

TABLE I

| | Composition Number | | | | | | | |
|---|---|---|---|---|---|---|---|---|
| | Control compositions | | | | | Compositions of the invention | | |
| Content in groups | 1 | 2 | 3 | 4 | 5 | 6 | 7 | 8 |
| % of stearic acid groups | 0 | 4 | 7.3 | 0 | 0 | 4.5 | 4 | 2.4 |
| % of dedecylbenzenesulfonic acid groups | 0 | 0 | 0 | 4.7 | 8.5 | 2 | 2.5 | 4 |

TABLE II

| | Composition No. | | | | | | | |
|---|---|---|---|---|---|---|---|---|
| | Molded control compositions | | | | | Molded compositions of the invention | | |
| Property | 0 | 1 | 2 | 3 | 4 | 5 | 6 | 7 | 8 |
| Unnotched Charpy at −20° C. percent broken (%) | 0 | 100 | 70 | 50 | 100 | 100 | 10 | 0 | 10 |
| Notched Charpy at 23° C. kj/m$^2$ | 3 | 4 | 4 | 8 | 7 | 10 | 25 | 19 | 16 |

While the invention has been described in terms of various preferred embodiments, the skilled artisan will appreciate that various modifications, subsitutions, omissions, and changes may be made without departing from the spirit thereof. Accordingly, it is intended that the scope of the present invention be limited solely by the scope of the following claims.

What is claimed is:

1. In a composition of matter comprising a polyvinyl chloride resin and a reinforcing amount of filler material therefor, the improvement which comprises, as said filler material, calcium carbonate particulates which are surface area treated with an impact strength enhancing amount of both (i) a sulfonic acid or salt thereof, and (ii) a fatty acid or salt thereof, said calcium carbonate particulates having a particle size ranging from 0.05 N to 10 N, and a BET specific surface ranging from 50 m$^2$/g to 0.2 m$^2$/g.

2. The composition of matter as defined by claim 1, said particle size ranging from 0.07 N to 1 N, and said BET specific surface ranging from 35 m$^2$/g to 2 m$^2$/g.

3. The composition of matter as defined by claim 1, said calcium carbonate particulates comprising finely ground natural calcium carbonate.

4. The composition of matter as defined by claim 1, said calcium carbonate particulates comprising chemically precipitated calcium carbonate.

5. The composition of matter as defined by claim 1, said sulfonic acid or salt thereof comprising an alkyl or alkylarylsulfonic acid or salt thereof, the alkyl radicals of which containing from 8 to 25 carbon atoms and aryl being phenyl and naphthyl.

6. The composition of matter as defined by claim 7, said sulfonic acid or salt thereof being dodecylbenzenesulfonic acid or salt thereof.

7. The composition of matter as defined by claim 7, said sulfonic acid or salt thereof comprising from 0.03 to 8% by weight of the calcium carbonate particulates.

8. The composition of matter as defined by claim 1, the calcium carbonate particulates being surface area treated with an amount of sulfonic acid or salt thereof less than that as would form a monomolecular layer of same over the entire surface area of said particulates.

9. The composition of matter as defined by claim 8, said particulates having been treated with an amount of sulfonic acid or salt thereof ranging from 20 to 99% by weight of that theoretical amount as would form a monomolecular layer of same over the entire surface area of said particulates.

10. The composition of matter as defined by claim 9, said particulates having been treated with an amount of sulfonic acid or salt thereof ranging from 30 to 60% by weight of that theoretical amount as would form a monomolecular layer of same over the entire surface area of said particulates.

11. The composition of matter as defined by claim 5, said fatty acid or salt thereof comprising an aliphatic carboxylic acid or salt thereof having greater than 10 carbon atoms.

12. The composition of matter as defined by claim 11, said fatty acid or salt thereof being stearic acid or salt thereof.

13. The composition of matter as defined by claim 12, said calcium carbonate particulates having a specific surface ranging from 10 to 50 m$^2$/g, and said stearic acid or salt thereof comprising from 1 to 8% by weight of said particulates.

14. The composition of matter as defined by claim 13, said specific surface ranging from 20 to 40 m²/g.

15. The composition of matter as defined by claim 8, the calcium carbonate particulates being surface area treated with an amount of fatty acid or salt thereof less than that as would form a monomolecular layer of same over the entire surface area of said particulates.

16. The composition of matter as defined by claim 1, comprising from 1 to 60 parts by weight of filler material per 100 parts by weight of rigid polyvinyl chloride resin.

17. The composition of matter as defined by claim 16, comprising about 20 parts by weight of filler material per 100 parts by weight of rigid polyvinyl chloride resin.

* * * * *

UNITED STATES PATENT AND TRADEMARK OFFICE
CERTIFICATE OF CORRECTION

PATENT NO. : 4,386,169
DATED : May 31, 1983
INVENTOR(S) : ARTUR et al

It is certified that error appears in the above-identified patent and that said Letters Patent is hereby corrected as shown below:

Column 1, line 21, change "decreaases" to --decreases--;

line 30, change "And different" to --Different--.

Column 2, lines 51-52, change "N" to --µm-- at each occurrence;

line 58, change "Ca(CO$_3$)$_2$" to --CaCO$_3$--.

Column 3, line 23, change "Ca(CO$_3$)$_2$ to --CaCO$_3$--.

Column 8, lines 16, 17 and 20, change "N" to --µm-- at each occurrence;

line 34, change "7" to --5--;

line 37, change "7" to --5--.

Signed and Sealed this

Twenty-third Day of October 1984

[SEAL]

Attest:

GERALD J. MOSSINGHOFF

Attesting Officer

Commissioner of Patents and Trademarks